United States Patent Office 2,822,320
Patented Feb. 4, 1958

2,822,320

RECLAIMING USED LUBRICATING OIL

Bill Mitacek, Bartlesville, Okla., assignor to Phillips Petroleum Company, a corporation of Delaware No Drawing. Application September 28, 1956
Serial No. 612,891

4 Claims. (Cl. 196—16)

This invention relates ot a method for purification of used lubricating oils. In one aspect it relates to a method for removing dissolved impurities and dispersed insoluble impurities from mineral oils.

It is known to treat used lubricating oils to remove impurities introduced therein in the use of such oils. It is common knowledge that lubricating oils in use become contaminated with solid materials such as rust and carbon and with dissolved or suspended sludge and acidic materials. It is also known to those skilled in the art that the contaminated lubricating oil can be processed to obtain therefrom a purified lubricating oil which can satisfactorily be used for further service in engine crank cases. The methods of the prior art have not been altogether satisfactory because of the requirement for conducting the purification at elevated temperatures, and because of other disadvantages.

It is therefore an object of this invention to provide a method for the removal of impurities from used lubricating oils in which the use of high temperature is not required. It is also an object of this invention to provide an agent for the treatment of used lubricating oils which exhibits limited but appreciable solubility in the lubricating oil, thereby providing improved contact between the treating agent and the impurities in the oil. It is a further object of this invention to provide a method for the purification of used lubricating oils with an inorganic treating agent wherein water is not formed in the purification reaction. Further objects and advantages of this invention will become apparent to one skilled in the art upon study of the the present disclosure.

This invention comprises a process for reclaiming lubricating oils which have been used in internal combustion engines by addition of a small quantity of hydrazine resulting in precipitation of the impurities as a sludge phase. The precipitation step is then followed by separation of the sludge phase and recovery of the oil phase. The recovered oil phase can be washed to remove dissolved hydrazine or can be heated to vaporize the hydrazine and can be clay treated for color improvement prior to reuse when desired.

The process of reclaiming lubricating oil can be practiced by contacting the oil with about 0.5 to about 10 volume percent or more of hydrazine (based on vol. of oil) providing sufficient agitation to the mixture to ensure adequate contact of the hydrazine with the impurities in the oil, separating the sludge which is formed, by settling, centrifuging or similar process, and recovering the oil phase for further use. The contacting of used oil and hydrazine can be carried out at temperatures preferably in the range of 50 to 150° F. although higher and lower temperatures can be used if desired. Atmospheric pressure is usually preferred although the purification treatment can be carried out at sub-atmospheric pressures or at super-atmospheric pressures if desired. The treatment can be carried out in many types of equipment, for example, centrifugal pumps, agitated tanks, and similar devices designed to provide thorough mixing of the contents. The separation of the oil phase from the sludge phase, which is produced by the treatment, can be effected either by gravity, such as an ordinary settling tank or a rotary stratifier, or by centrifuges, or the like.

When desired, the lubricating oil can be clay treated as a first step of treatment, in order to remove part of the impurities, and can also be given a final clay treatment in order to improve the color of the reclaimed oil prior to reuse. Either or both of the clay-treated steps can be eliminated if desired.

It is also within the concept of this invention to water-wash the oil phase recovered from the process to remove dissolved hydrazine which may remain in the treated oil, or removal of the hydrazine can be effected by washing with a dilute acid followed by a water wash. Hydrazine can also be removed by distillation.

The following example illustrates a specific embodiment of the invention, but is not to be construed as limiting the example.

An engine test has been devised to produce maximum sludging in an engine crankcase. In this test the engine is operated in six hour cycles according to the schedule shown in the following Table I.

TABLE I

| Test hours | Speed, R. P. M. | Horse Power, B. H. P. | Temperatures, ° F. | | Air-Fuel Ratio | Spark Advance degrees, BTDC |
|---|---|---|---|---|---|---|
| | | | Water Out | Oil | | |
| 2 | 500 | 0 | 125±2 | | 8.9 to 9.2 | 5 |
| 2 | 2,500 | 45 | 95±2 | 165±5 | 14.5±0.5 | 38±3 |
| 2 | 2,500 | 45 | 200±2 | 245±5 | 14.5±0.5 | 38±3 |

A 96 hour test will comprise 16 operating cycles. The test is usually referred to as a cold engine sludge test.

EXAMPLE

A used oil sample was obtained from a 96-hour cold engine sludge test as described above and was divided into three portions. One portion was treated with 5 volume percent hydrazine, the second with 10 volume percent hydrazine, and the third sample was not treated. Table II contains analytical data obtained on each of these portions and on the original (new) oil prior to the engine test. The new oil was a dewaxed-solvent extracted paraffin base lubricating oil containing 0.75 percent Lubrizol 309 (trademark) available from the Lubrizol Corporation and believed to comprise an ester of zinc dithiophosphate and a small amount of barium sulfonate.

TABLE II

Treatment of used lube oil with hydrazine

| | New Oil | Used Oil from Engine Test (96 hours) | | |
|---|---|---|---|---|
| | | Untreated | Hydrazine Treated With— | |
| | | | 10 Vol. Percent | 5 Vol. Percent |
| Vis. at 100° F., SUS | 518.8 | 665.5 | 422.9 | 429.8 |
| Vis. at 210° F., SUS | 64.87 | | 59.61 | 60.0 |
| V. I. | 99 | | 99 | 99 |
| Neut. No | 0.21 | 0.48 | 0.12 | 0.12 |
| Ramsbottom C Res | 0.24 | 6.98 | 0.32 | 0.39 |
| Ash | 0.23 | 1.86 | 0.09 | 0.12 |
| NPA Color | 2½ | | >8 | >8 |
| API Grav | 28.5 | | 27.6 | 27.3 |
| Naphtha Insol | | 7.39 | 0.03 | 0.06 |
| CHCl₃ Insol | | 0.35 | | |
| Pour Point, ° F | | | +5 | +5 |

It will be noted that hydrazine treatment resulted in lower carbon residue, ash, and naphtha insolubles in comparison with the untreated used oil. The used oil contained a considerable amount of sludge which was precipitated by the hydrazine.

Reasonable variations and modifications are possible within the scope of the disclosure of this invention, the essence of which is the discovery that hydrazine can be utilized as a treating agent in reclaiming used lubricating oils at ordinary temperatures and pressures.

That which is claimed is:

1. A process for removing impurities from used lubricating oil which comprises intimately admixing hydrazine with said oil; and recovering purified lubricating oil as a product of the process.

2. A process for removing dispersed impurities from used lubricating oil which comprises intimately admixing hydrazine with said oil in an amount in the range of 0.5 to 10 volume percent with said oil; separating and removing resulting precipitate therefrom; washing the resulting oil with water and recovering purified oil therefrom as a product of the process.

3. A process for removing dispersed impurities from used lubricating oil which comprises intimately admixing hydrazine with said oil in an amount of 0.5 to 5 volume percent of said oil; separating resulting precipitate therefrom; washing the resulting oil with water; contacting the water-washed oil with a sufficient amount of clay to improve the color of the oil; and recovering a purified oil therefrom as the product of the process.

4. A process for removing dispersed impurities from used lubricating oil which comprises contacting said oil with finely divided clay; separating said oil from said clay; intimately admixing hydrazine with said oil in an amount of 0.5 to 5 volume percent of said oil; separating and removing a resulting precipitate therefrom; water-washing the resulting oil; contacting said water-washed oil with a sufficient amount of finely divided clay to improve the color of said oil; and recovering said oil from said clay as the product of the process.

References Cited in the file of this patent

UNITED STATES PATENTS

| | | |
|---|---|---|
| 1,849,654 | Baylis | Mar. 15, 1932 |
| 2,368,596 | Johnston et al. | Jan. 30, 1945 |
| 2,393,335 | Musselman | Jan. 22, 1946 |